United States Patent
Harding et al.

[15] 3,635,089
[45] Jan. 18, 1972

[54] APPARATUS AND PROCESS FOR THE MEASUREMENT OF THE PRESSURE OF CORROSIVE MATERIAL

[72] Inventors: William R. Harding, State College, Pa.; Vincent G. Hill, Kingston, Jamaica

[73] Assignee: The Carborundum Company, Niagara Falls, N.Y.

[22] Filed: Dec. 2, 1969

[21] Appl. No.: 881,527

[52] U.S. Cl. ................................... 73/395, 73/406
[51] Int. Cl. ............................................. G01l 7/08
[58] Field of Search .................... 73/395, 152, 406

[56] References Cited

UNITED STATES PATENTS

| | | | |
|---|---|---|---|
| 2,284,707 | 5/1942 | Wilson | 73/395 X |
| 2,883,995 | 4/1959 | Bialous et al. | 73/395 X |
| 3,350,931 | 11/1967 | Johnson et al. | 73/152 |

Primary Examiner—Donald O. Woodiel
Attorney—K. W. Brownell

[57] ABSTRACT

Apparatus for subjecting a corrosive material to a controlled pressure comprises a pressure vessel and a pressure measurement chamber, separated by a flexible diaphragm, which keeps the corrosive material within the pressure vessel, yet allows pressure to be transmitted to the pressure measurement chamber for measurement. Two methods of maintaining the flexible diaphragm in a pressure-transmissive position are described.

3 Claims, 3 Drawing Figures

PATENTED JAN 18 1972

3,635,089

INVENTORS
WILLIAM R. HARDING
VINCENT G. HILL
BY
*R. W. Brownell*
ATTORNEY

APPARATUS AND PROCESS FOR THE MEASUREMENT OF THE PRESSURE OF CORROSIVE MATERIAL

BACKGROUND OF THE INVENTION

This invention relates to apparatus and a process for the measurement of the pressure of corrosive material.

Numerous physical or chemical changes require high pressures, and frequently also high temperatures, for their accomplishment. Many of these changes require or proceed more expeditiously using corrosive solutions as well, for example the hydrothermal growth of various crystals such as potassium tantalate/niobate (D. J. Marshall and R. A. Laudise, pages 557–61 in *Crystal Growth*, H. S. Peiser, ed., Pergamon Press, Inc., 1967), beryllium oxide (V. G. Hill and R. I. Harker, J. Electrochem. Soc. 115, 294–98) and rare earth orthoferrites (E. D. Kolb et al., J. Appl. Phys. 39, 1362–64).

It is, of course, desirable to measure and control the pressure within the vessel during these physical or chemical changes, either to control the changes, to determine what pressures produce particular observed changes, or to maintain the pressure within safe limits. When a noncorrosive solution is employed, it is possible to measure the pressure within a pressure vessel with a pressure gauge which is either directly upon the vessel or physically removed from the vessel and connected by means of a pressure line. It is undesirable, however, to allow corrosive materials to come into contact with the pressure gauge, since the gauge could be destroyed by the corrosive materials. The use of pressure lines is only a partial solution to the problem, since the corrosive material may eventually reach the pressure gauge. Furthermore, the existence of pressure lines containing highly pressurized corrosive materials presents an ever-present hazard, since even a slight leak anywhere in the system would release the corrosive material, possibly resulting in considerable damage.

It is, therefore, an object of this invention to provide a process and apparatus for the measurement of pressure of a corrosive material, while maintaining the corrosive material within its pressure vessel.

SUMMARY OF THE INVENTION

These and other objects are accomplished according to the present invention with an apparatus for subjecting a corrosive material to a controlled pressure comprising a pressure vessel, lined with a material which is resistant to attack by the corrosive material to be subjected to pressure, and having a mouth for the insertion and removal of corrosive material; and provided with a pressure measurement chamber adjacent to the pressure vessel mouth, separated from the vessel by a flexible pressure-transmitting vessel diaphragm. The diaphragm covers the vessel mouth, thereby preventing the escape of corrosive material from the vessel, and simultaneously transmits pressure to the pressure measurement chamber. The pressure within the pressure measurement chamber is then determined and taken as a measure of the pressure within the vessel itself.

The diaphragm must remain in a pressure-transmissive position during this process. This can be accomplished in at least two ways. First, an electrical lead can be provided within the pressure measurement chamber, positioned so as to contact the vessel diaphragm upon the approach of the vessel diaphragm into the pressure measurement chamber; or a system of valves can be used to ascertain the pressure-transmissive position of the vessel diaphragm.

Using the first method, an electrical lead is positioned such that the vessel diaphragm makes contact with the lead whenever the diaphragm approaches into the pressure measurement chamber. This contact is detected electrically, and whenever contact is detected between the lead and the diaphragm pressure is increased within the pressure measurement chamber until contact between the lead and the diaphragm is broken. If it is suspected that the pressure within the pressure measurement chamber is greater than that within the pressure vessel, the pressure within the pressure measurement chamber can be decreased until contact is detected, and then increased slightly until contact is broken. This insures that the diaphragm is in a pressure-transmissive position, so that the pressure within the pressure measurement chamber approximates that within the pressure vessel.

Using the second method, a system of valves is used for periodically slightly altering the pressure within the pressure measurement chamber in order to flex the vessel diaphragm and thereby detect any pressure disparity between the pressure vessel and the pressure measurement chamber. Whenever such a disparity is detected the pressure within the pressure measurement chamber is altered, either by increasing or decreasing the pressure, so that the disparity no longer exists. The pressure within the pressure measurement chamber can then again be taken as a measure of the pressure within the pressure vessel itself.

DETAILED DESCRIPTION

Figure 1:
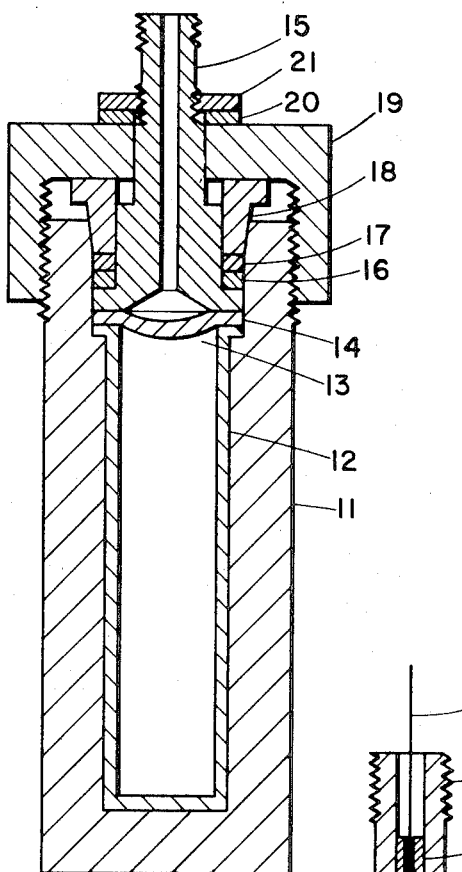
FIG. 1 is a sectional view of a pressure vessel for use in the present invention.

The present invention can be easily understood by reference to the drawings. In FIG. 1, a sectional view of a pressure vessel according to the present invention is illustrated. Vessel housing 11, preferably constructed of a sturdy material such as stainless steel, is lined with a material 12 which is resistant to attack by the corrosive material to be subjected to pressure. The mouth 13 is covered with a flexible pressure-transmitting vessel diaphragm 14. Both the lining material 12 and at least the exposed surface of the vessel diaphragm 14 must be of a material which is resistant to attack by the corrosive material to be subjected to pressure. It is preferred that the entire vessel diaphragm 14 be of a single material, e.g., silver. However, depending on the corrosive material to be studied, various other solid noble metals, e.g., palladium, iridium, rhodium, ruthenium, osmium, gold or platinum can be used for the vessel lining and diaphragm. Other materials which are inert under the conditions of use can also be used. Vessel diaphragm 14 is held in place by plunger 15 which is in turn held down by sealing gasket 16, backup gasket 17, thrust washer 18 and capnut 19. Additional stability is obtained by using a washer 20 held in place by a nut 21.

EXAMPLE I

Figure 2:
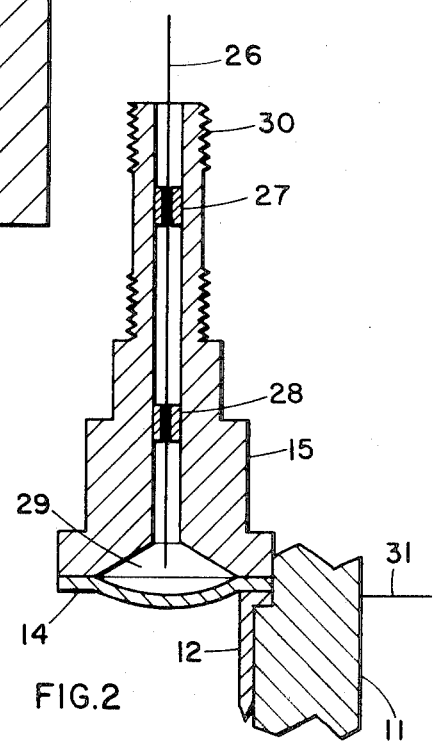
FIG. 2 is an expanded sectional partial view of the vessel of FIG. 1 illustrating a first preferred embodiment of the present invention.

Referring now to FIG. 2, a first preferred embodiment of the present invention is illustrated. Plunger 15 is provided with an electrical lead 26 which is supported within plunger 15 by support means 27 and 28 which electrically insulate lead 26 from plunger 15 but which allow the passage of a pressure-transmitting fluid. The space 29 within plunger 15 constitutes a portion of a pressure measurement chamber. The end 30 of plunger 15 is connected by means of a pressure line (not shown) to a distant pressure gauge (also not shown). The pressure within the pressure measurement chamber is then determined and taken as the pressure within the pressure vessel itself. This represents an accurate assessment of the pressure within the vessel, however, only so long as diaphragm 14 remains in a pressure-transmissive position. In other words, if the pressure within the pressure vessel becomes so great as to push diaphragm 14 up within the space 29 within plunger 15 so that further flexing is impossible, no further pressure would be transmitted by diaphragm 14 to the pressure measurement chamber.

In order to insure that diaphragm 14 remains in such a pressure-transmissive position, according to this embodiment of the present invention, lead 26 is provided. Whenever the pressure within the pressure chamber increases, causing diaphragm 14 to approach into the pressure measurement chamber, contact is made between lead 26 and diaphragm 14. A second electrical lead 31, connected via vessel housing 11 and lining 12 to diaphragm 14, is provided. Whenever the circuit between lead 26 and lead 31 is closed, pressure within the pressure measurement chamber is increased. This process is continued until the circuit is broken by the flexing of diaphragm 14 away from electrical lead 26. This process can be repeated indefinitely. If it is suspected that the pressure within the pressure vessel is less than the pressure within the pressure measurement chamber, it is always possible to release a slight amount of pressure within the pressure measurement chamber until contact between lead 26 and diaphragm 14 is accomplished. The pressure within the pressure measurement chamber can then be increased until diaphragm 14 breaks contact with lead 26. Thus it is always easy to insure that diaphragm 14 is relatively close to lead 26, but not touching, and therefore in a flexible, pressure-transmissive position.

EXAMPLE II

Figure 3:
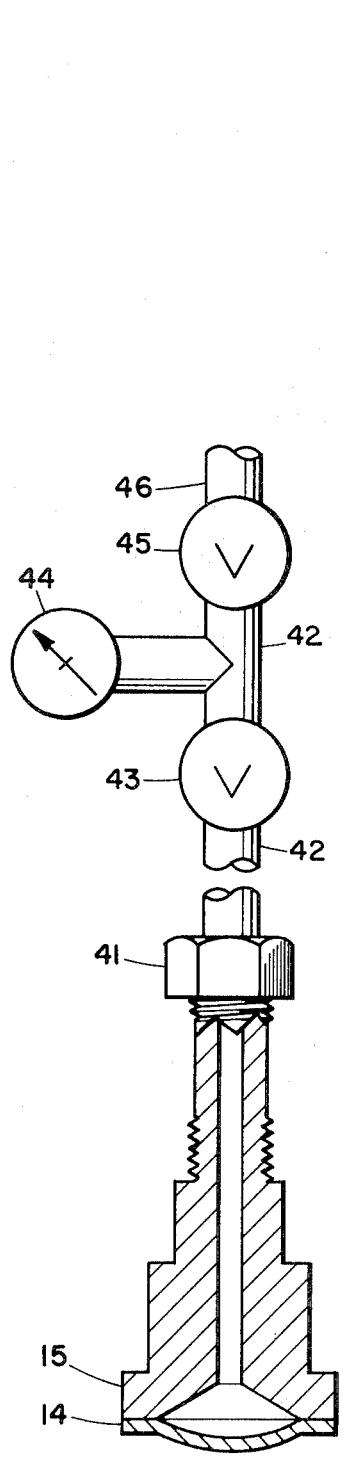
FIG. 3 is a second expanded partial view of the vessel of FIG. 1, partially in section and illustrating a second preferred embodiment of the present invention.

Referring now to FIG 3, a second preferred embodiment of the present invention is illustrated. In this case, no electrical leads are required. Plunger 15 is connected by means of nut 41 and pressure line 42 to a first valve 43. Next, pressure line 42 is connected to pressure gauge 44 and further to a second valve 45. The end 46 of pressure line 42 past the second valve 45 is connected to a pump (not shown). Ordinarily, valve 43 is open and valve 45 is closed. When it is desired to determine if the pressure within the pressure measurement chamber is the same as the pressure within the pressure vessel itself, valve 43 is closed, valve 45 is opened and the pump is activated to increase the pressure shown on gauge 44. For example, if the pressure shown on the gauge is on the order of 500–2000 atmospheres, the pressure should be increased on the order of 1,000 p.s.i. Then valve 45 is closed and valve 43 is opened. This action will flex diaphragm 14 slightly and if the correct pressure is indicated then the gauge reading will return to almost the original value. If, however, diaphragm 14 had been pushed up within plunger 15 so that diaphragm 14 were no longer pressure transmissive, allowing the pressure within the pressure vessel to become greater than the pressure within the pressure measurement chamber, than a net increase in pressure at gauge 44 would be observed. It would then be necessary to repeat the valve opening and closing process as outlined above until substantially equal pressures at gauge 44 were obtained on two successive readings. This would indicate that diaphragm 14 had been dislodged from its position up within plunger 15, and was again flexible and pressure transmissive.

We claim:

1. Apparatus for subjecting a corrosive material to a controlled pressure and measuring the pressure thereof, comprising:
    1. a pressure vessel, lined with a material which is resistant to attack by the corrosive material to be subjected to pressure, and having a mouth for the insertion and removal of corrosive material;
    2. a pressure measurement chamber detachably connected to the pressure vessel mouth, separated from the vessel by;
    3. a flexible, pressure-transmitting vessel diaphragm, having a surface which is resistant to attack by the corrosive material to be subjected to pressure,
        a. covering the vessel mouth, whereby to prevent the escape of corrosive material therefrom, and
        b. transmitting pressure to the pressure measurement chamber;
    4. means for measuring the pressure within the pressure measurement chamber; and
    5. means for maintaining the vessel diaphragm in a pressure-transmissive position, comprising:
        a. an electrical lead within the pressure measurement chamber, positioned so as to contact the vessel diaphragm upon the approach of the vessel diaphragm into the pressure measurement chamber;
        b. means for detection of contact between the electrical lead and the vessel diaphragm; and
        c. means for increasing pressure within the pressure measurement chamber.

2. Apparatus according to claim 1, wherein the means for increasing pressure includes a means for repeatedly increasing the pressure within the pressure measurement chamber.

3. A process for measuring the pressure of a corrosive material comprising:
    1. enclosing the corrosive material within a pressure vessel lined with a material which is resistant to attack by the corrosive material to be subjected to pressure, the vessel having a mouth for the insertion and removal of corrosive material;
    2. covering the vessel mouth with a flexible, pressure-transmitting vessel diaphragm, whereby to prevent the escape of corrosive material therefrom;
    3. providing a pressure measurement chamber adjacent the pressure vessel mouth, the vessel diaphragm transmitting pressure to the pressure measurement chamber; and
    4. measuring the pressure within the pressure measurement chamber; said flexible, pressure-transmitting vessel diaphragm being maintained in a pressure-transmitting position by:
        a. providing an electrical lead within the pressure measurement chamber, positioned so as to contact the vessel diaphragm upon the approach of the vessel diaphragm into the pressure measurement chamber;
        b. detecting any contact between the electrical lead and the vessel diaphragm; and
        c. upon detecting any contact between the lead and the diaphragm, increasing pressure within the pressure measurement chamber until contact between the lead and the diaphragm is broken.

* * * * *